3,600,390
NOVEL 5-PHENYL IMIDAZOLIDINO[5,1-a]5H-QUINAZOLINES AND PROCESS THEREFOR
Margaret H. Sherlock, Bloomfield, N.J., assignor to Schering Corporation, Bloomfield, N.J.
No Drawing. Filed July 1, 1968, Ser. No. 743,912
Int. Cl. C07d 57/12
U.S. Cl. 260—256.4                                  8 Claims

ABSTRACT OF THE DISCLOSURE

This invention relates to certain 5-phenylimidazolidino [5,1-b]5H-quinazolines, the [5,1-a]isomers thereof and to their use as bronchodilating agents.

---

This invention relates to compositions of matter classified in the art of organic chemistry as substituted 5-phenyl imidazolidino[5,1-b]5H-quinazolines and to processes for making and using such compositions.

The invention sought to be patented in its composition of matter aspect resides in the chemical compounds having the molecular structure in which there is attached to a 5-phenyl imidazolidino[5,1-b]5H-quinazoline nucleus as $R_1$ radical in the 2-position, $R_2$ and $R_3$ radicals in the 3-position and X and Y radicals in the 6-, 7-, 8- and 9-positions thereof wherein $R_1$ is hydrogen, saturated and unsaturated hydrocarbyl radicals having up to six carbon atoms, cyclo lower alkyl, pyridyl alkyl, phenyl, phenyl lower alkyl, hydroxy lower alkyl, or acyloxy lower alkyl, $R_2$ is hydrogen or lower alkyl, $R_3$ is hydrogen, lower alkyl, phenyl, phenyl lower alkyl, heterocyclic radicals, haloalkyl, and when $R_2$ and $R_3$ are taken together with the carbon atom they form a cycloalkyl moiety or a 5–6 membered nitrogen containing heterocyclic moiety, and said X and Y radicals being hydrogen, halogen, trifluoromethyl, lower alkyl, nitro and alkoxy. Included within this concept are the [5,1-a]5H-quinazoline isomers thereof, and the pharmaceutically acid addition salts thereof.

The invention sought to be patented in another of its composition aspects resides in the concept of pharmaceutical dosage forms containing a novel compound of this invention, said dosage forms optionally containing a theophylline-type bronchodilating agent designed to effect a synergistic and additive effect when in combination with a compound of this invention.

The invention sought to be patented in one of its process aspects is described as residing in the concept of effecting a bronchodilating effect by administering a therapeutically effective quantity of a compound of this invention, said compound being the sole active ingredient or being in combination with known bronchodilating agents.

The invention sought to be patented in another of its process aspects is described as residing in the concept of condensing an appropriately substituted 2-halomethyl-4-phenyl-3,4-dihydroquinazolines with an appropriate primary amine to form an appropriately substituted 2-$R_1$-aminomethyl-4-phenyl-3,4-dihydroquinazoline ($R_1$ being the substituent desired in the 2-position of the imidazolidino quinazoline) which when cyclized with the appropriate aldehyde or ketone, or its equivalently functioning ketals, form a desired compound of this invention.

More specifically, the tangible embodiments of the compositions of matter of this invention relate to those 5-phenylimidazolindino[5,1-b]5H-quinazolines having the structural formula:

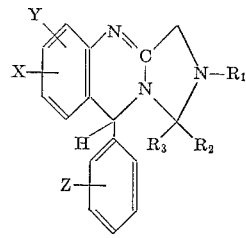

and the [5,1-a]isomers thereof, and the pharmaceutically acceptable acid addition salts thereof, wherein attached to a 5-phenyl imidazolidino[5,1-b]5H-quinazoline nucleus an $R_1$ radical in the 2-position, $R_2$ and $R_3$ radicals in the 3-position and X and Y radicals in the 6-, 7-, 8- and 9-positions thereof wherein $R_1$ is hydrogen, saturated and unsaturated hydrocarbyl radicals having up to six carbon atoms, cyclo lower alkyl, phenyl, pyridyl alkyl, phenyl lower alkyl, hydroxy lower alkyl, or acyloxy lower alkyl, $R_2$ is hydrogen or lower alkyl, $R_3$ is hydrogen, lower alkyl, phenyl, phenyl lower alkyl, heterocyclic radicals, haloalkyl, and when $R_2$ and $R_3$ are taken together with the carbon atom they form a cycloalkyl moiety or a 5–6 membered nitrogen containing heterocyclic moiety, and said Z, X and Y radicals being hydrogen, halogen, trifluoromethyl, lower alkyl, nitro and alkoxy. Included within this concept are the [5,1-a]5H-quinazoline isomers thereof, and the pharmaceutically acid addition salts thereof.

When used, "lower alkyl" or "saturated hydrocarbyl" includes straight and branched-chain radicals containing up to six carbon atoms, including isopropyl, butyl, t-butyl and preferably methyl and ethyl. The unsaturated hydrocarbyl radicals are those counter-parts of the foregoing lower alkyl radicals wherein there is at least one double bond, such as allyl; hydroxy lower alkyl includes hydroxybutyl and the like but preferably represents hydroxyethyl. The acyloxy lower alkyl radicals are those esters formed by the interaction of the hydroxyalkyl and a monobasic carboxylic acid having up to 14 carbon atoms, said radicals being more conveniently represented as

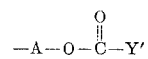

wherein A is lower alkyl and Y' is alkyl, alkenyl, alkynyl, including both straight and branched chain radicals, and includes such esters as enanthate, octanoate, laurate, stearate, 2-heptanoate, 2-nonenoate and the like. When representative of a mono- or bicyclic heterocycle radical $R_3$ is, for example, an aza-, oxa- and/or thiacyclic aryl radicals, preferably a mono- azacyclic aryl radical such as a 2-, 4- or especially 3-pyridyl radical, a 2- or 2-pyrryl, a 2-, 4- or 5-imidazyl, a 2- or 3-furyl, a 2- or 3-thienyl; a 4-oxazolyl or thiazolyl, a 3-isoxazolyl, a 2-pyrazinyl, a 2- or 3-indolyl, a 2-, 3-, 4- or quinolyl or a 1-, 3-, 4- or isoquinolyl radical. Preferably when $R_2$ and $R_3$ are taken together with the 3-position carbon atom, a cyclopropyl, cyclohexyl, a piperidyl radical is formed. The X, X', Y and Z substituents include such monovalent radicals as propyl, butyl, and pentyl but preferably methyl and ethyl when representative of lower alkyl; fluoro and iodo but preferably chloro and bromo when representative of halogeno; propoxy and butyroxy but preferably methoxy and ethoxy when representative of lower alkoxy. In general, the term "lower" when used to modify the monovalent radicals is meant to embrace those radicals having up to six carbon atoms. When "phenyl" is used it includes phenyl and the X' substituted phenyl radicals wherein X' is lower alkyl, trifluoromethyl, nitro, alkoxy and halogeno, said substituents being in the ortho, meta, but preferably para positions.

In general, the compounds of this invention may be prepared by cyclizing an appropriately substituted 2-R-aminomethyl-4-phenyl-3,4-dihydroquinazoline with an appropriate aldehyde, or ketone, or equivalently functioning derivative thereof. The cyclization may be effected by heating the reactants together in the presence of a suitable inert solvent under conditions such that any water is azeotropically removed. Preferably, the heating takes place at about reflux temperature of the reaction mixture although any temperature intermediate room and reflux temperatures is suitable. Preferably, the solvents used are methanol, toluene, benzene, although other alkanol, hydrocarbon, and other suitable solvents may be utilized, the choice of solvent being consistent with the particular aldehydic or ketonic reactants used in the particular reaction mixture. This reaction may be depicted as follows:

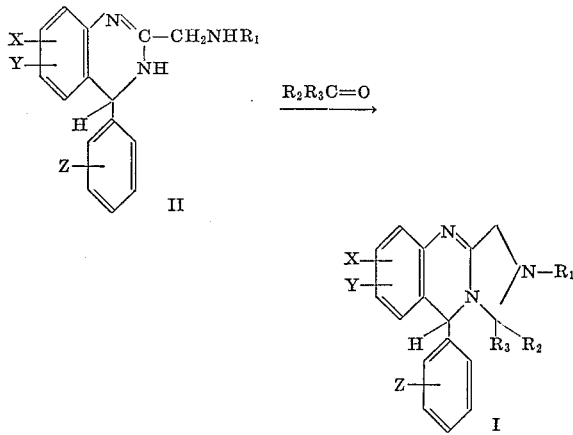

wherein $R_1$, $R_2$, $R_3$, X, Y and Z are as previously defined. In those instances wherein a [5,1-a]isomer is formed, the isomers of the compounds depicted in Formula I are depicted as follows:

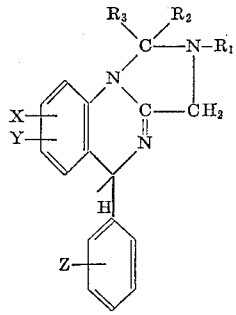

$R_1$, $R_2$, $R_3$, X, Y and Z being as previously defined. If desired, as is the general case, the isomer of Formula Ia may be isomerized to those isomers representated by the structure depicted in Formula I. In those instances wherein mixtures of the isomeric compounds are obtained, the isomers may be separated into single isomers based, for example, on physiochemical differences, such as different solubilities or different melting points. Thus, mixtures of isomers may be separated by fractional crystallization, if necessary, by using a derivative thereof, e.g. a salt. Racemic products can likewise be resolved into the optically active antipodes by reaction with optically active acids, separation of the diastereomeric salts and liberation of the bases from the salts according to standard techniques.

In those instances wherein $R_1$ represents an acyloxy alkyl function, i.e.

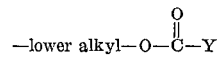

such esters may be formed by the interaction of compounds of Formula I (and Ia) wherein $R_1$ represents hydroxyalkyl with an acyl halide (preferably acyl chloride) the reaction preferably being conducted in an organic solvent, such as chloroform. Among the more suitable acyl halides are higher alkanoic acids such as heptanoic, octanoic, 2-ethylheptanoic, 2,2-diethylbutyric, capric, lauric, tridecylic, myristic, palmitic and stearic acid and the acyl chlorides of higher alkanoic acids as 2-heptanoic, 2-nonenoic, citronellic, undecylenic acid, and oleic acids and such other acids known for their prolonged action inducing effects.

The necessary 2-$R_1$-aminomethyl-4-phenyl-3,4-dihydroquinazolines (II) are prepared by condensing an appropriately substituted 2-halomethyl-4-phenyl-3,4-dihydroquinazoline with a primary amine by standard techniques. In general, it is preferred to admix the reactants and allow the condensation to take place at room temperature over a period of several hours, although the condensation may be hastened at slightly elevated temperatures. The foregoing reactions may be depicted as follows:

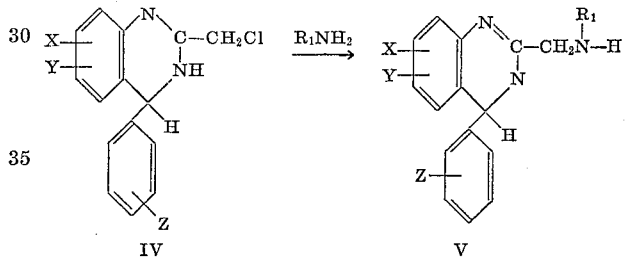

alternatively, the necessary intermediates (II) may be prepared by the reaction of an appropriately substituted 2-$R_1$-aminomethyl quinazoline with an appropriately substituted phenyl magnesium halide, or other equivalently functioning reactive moiety, according to standard and well known techniques.

The starting materials for the preparation of the compounds of Formula II are substituted 2-aminobenzhydrols which are prepared by hydrogenating the corresponding 2-aminobenzophenone with an agent capable of transforming the carbonyl group to a carbinol. Reduction with sodium borohydride according to conventional methods is preferred, although other agents, both chemical and catalytic, are equally useful. The precursors (i.e. the X, Y, Z-substituted-2-aminobenzophenones), are either well known in the art or may be made by methods readily apparent to one skilled in the art. The 2-aminobenzhydrols are converted to the appropriate 2-halomethyl-4-phenyl-3,4-dihydroquinazoline by reacting the benzhydrol with chloroacetonitrile in the presence of sulfuric acid. This reaction may be depicted as follows:

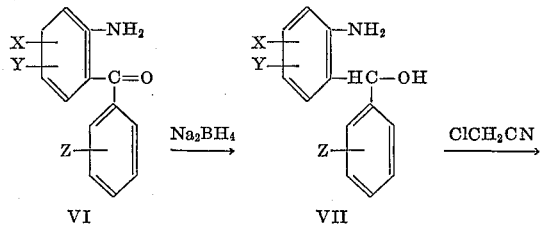

A free base of Formula I is converted into a salt thereof, by its treatment with an acid or an anion exchange preparation. Preferred salts are those of therapeutically useful acids, such as inorganic acids, e.g. hydrochloric, hydrobromic, nitric, sulfuric, or phosphoric acid, or organic acids, such as carboxylic or sulfonic acids, e.g. acetic, propionic, glycolic, malonic, succinic, maleic, hydroxymaleic, fumaric, malic, tartaric, citric, glucuronic, benzoic, salicyclic, 4-aminosalicyclic 2-acetoxybenzoic, pamoic, nicotinic, isonicotinic, methane sulfonic, ethane sulfonic, ethane 1,2-disulfonic, 2-hydroxyethane sulfonic, benzene sulfonic, toluene sulfonic or naphthalene 2-sulfonic acid, methionine, lysine, trytophan or arginine. Other acid addition salts are useful as intermediates for the preparation of the pure parent compounds or in the manufacture of other salts, as well as for identification or characterization purposes. Addition salts primarily used for the latter are, for example, those with certain inorganic acids, e.g. perchloric, phosphotungstic, phosphomolybdic, chloroplatinic or Reinecke acid or with acidic organic nitro compounds, e.g. picric, picrolonic or flavianic acid. The bases are converted into salts, the salts are separated and the bases liberated from the salts. In view of the close relationship between the free compounds and the compounds in the form of their salts, whenever a free compound is referred to in this context, a corresponding salt is also intended, provided such is possible and useful.

The following examples are intended to illustrate the methods of preparing the compounds of this invention:

EXAMPLE I 2-chloromethyl-6-chloro-4-phenyl-3,4-dihydroquinazoline

To a solution of 330 ml. of chloroacetonitrile containing 103 ml. of concentrated sulfuric acid, there is added, with stirring, 86 g. of 2-amino-5-chlorobenzhydrol keeping the reaction temperature below 40°. The reaction mixture is allowed to stir at room temperature overnight, concentrated in vacuo and the residue poured onto water and basified with dilute sodium hydroxide solution. The product is extracted with methylene chloride, dried over anhydrous sodium sulfate, concentrated and the product recrystallized from benzene, M.P. 157–158°.

To obtain quinazolines having substituents X and Y the appropriately substituted 2-aminobenzhydrol is utilized. Representative of such compounds are the following: X and Y-substituted 2-aminobenzhydrols wherein X and Y are 3-chloro, 4-chloro, 5-chloro, 6-chloro, 3-bromo, 4-bromo, 5-bromo, 6-bromo, 4,5-dichloro, 5-methyl, 5-methoxy, 4,5-dimethoxy, 5-trifluoromethyl, 4-trifluoromethyl, 5-nitro and the like. It is likewise obvious that if it is desired to prepare a Z-substituted-4-phenyl-3,4-dihydroquinazoline intermediate then the benzhydrol will be further appropriately substituted.

EXAMPLE II 6-chloro-2-methylamino-4-phenyl,3,4-dihydroquinazoline

To 250 ml. of 25% methanolic methylamine there is added 32.7 g. of 2-chloromethyl 6-chloro-4-phenyl-3,4-dihydroquinazoline and the solution allowed to stand overnight. The reaction mixture is concentrated, poured into 10% sodium hydroxide solution, cooled and filtered, M.P. 137–138°.

In a similar manner, the following compounds, by the use of the appropriately substituted 2-chloromethyl-4-phenyl-3,4-dihydroquinazoline:

6,7-dichloro-2-methylaminomethyl-4-phenyl-3,4-dihydroquinazoline;
6-methoxy-2-methylaminomethyl-4-phenyl-3,4-dihydroquinazoline;
6-trifluoromethyl-2-methylaminomethyl-4-phenyl-3,4-dihydroquinazoline;
6-methyl-2-methylaminomethyl-4-phenyl-3,4-dihydroquinazoline;
6-nitro-2-methylaminomethyl-4-phenyl-3,4-dihydroquinazoline;
6-bromo-2-methylaminomethyl-4-phenyl-3,4-dihydroquinazoline;
6,7-dimethoxy-2-methylaminomethyl-4-phenyl-3,4-dihydroquinazoline;
8-chloro-2-methylaminomethyl-4-phenyl-3,4-dihydroquinazoline;
6-chloro-2-methylaminomethyl-4-p-chlorophenyl-3,4-dihydroquinazoline;
6-chloro-2-methylaminomethyl-4-p-methylphenyl,3,4-dihydroquinazoline;
6-methoxy-2-methylaminomethyl-4-p-methoxyphenyl-3,4-dihydroquinazoline; and
2-methylaminomethyl-4-phenyl-3,4-dihydroquinazoline.

EXAMPLE III 7-chloro-2-methyl-5-phenyl-imidazolidino[5,1-a]-5H-quinazoline

A solution of 2.0 g. of 6-chloro-2-methylamino-4-phenyl-3,4-dihydroquinazoline and 0.25 g. of p-formaldehyde in 30 ml. of benzene is refluxed for 30 minutes. The solvent is removed in vacuo and the product recrystallized from isopropyl ether, M.P. 155–157°.

EXAMPLE IV 7-chloro-2-methyl-5-phenyl-imidazolidino[5,1-b]5H-quinazoline

A solution of 6.8 g. of 6-chloro-2-methylamino-4-phenyl-3,4-dihydroquinazoline and 2.3 ml. of 36% formaldehyde and 60 ml. of methanol is refluxed for two hours. The reaction mixture is concentrated in vacuo and the product recrystallized from isopropyl ether, M.P. 140–141.5°.

The treatment of the free base in ethanol with ethanolic hydrogen chloride yields the monohydrochloride which decomposes at 230° after recrystallization from ethanol ether.

In a similar manner, by substituting the 6-chloro-2-methylaminomethyl - 4 - phenyl - 3,4 - dihydroquinazoline reactant with the appropriately substituted reactant and by substantially following the methods of Examples III and IV, there is produced:

7-chloro-2,3-dimethyl-5-phenyl-imidazolidino[5,1-b]5H-quinazoline;
7-chloro-2-isopropyl-5-phenyl-imidazolidino[5,1-b]5H-quinazoline;
7-chloro-5-phenyl-2,3,3-trimethyl-imidazolidino[5,1-b]5H-quinazoline;
7-chloro-2-methyl-5-(p-chlorophenyl)-imidazolidino[5,1-b]5H-quinazoline;
2-methyl-5-phenyl-imidazolidino[5,1-b]5H-quinazoline;
2-methyl-5-(p-chlorophenyl)-imidazolidino[5,1-b]5H-quinazoline;
2-cyclopropyl-5-phenyl-imidazolidino[5,1-b]5H-quinazoline;
7-chloro-5-phenyl-imidazolidino[5,1-b]5H-quinazoline;
2-hydroxyethyl-5-phenyl-imidazolidino[5,1-b]5H-quinazoline;
7-chloro-2-hydroxyethyl-5-phenyl-imidazolidino[5,1-b]5H-quinazoline;
7-chloro-2-methyl-3-(p-chlorophenyl)-5-phenyl-imidazolidino[5,1-b]5H-quinazoline;
2-methyl-3,5-diphenyl-imidazolidino[5,1-b]5H-quinazoline;
7-chloro-2-methyl-3,5-diphenyl-imidazolidino[5,1-b]5H-quinazoline;
3-phenethyl-5-phenyl-imidazolidino[5,1-b]5H-quinazoline;
2-cyclopropyl-7-chloro-5-phenyl-imidazolidino[5,1-b]5H-quinazoline;
3-dichloromethyl-2-methyl-5-phenyl-imidazolidino[5,1-b]5H-quinazoline;
7,8-dichloro-2-methyl-5-phenyl-imidazolidino[5,1-b]5H-quinazoline;
7-trifluoromethyl-2-methyl-5-phenyl-imidazolidino[5,1-b]5H-quinazoline;

2,7-dimethyl-5-phenyl-imidazolidino[5,1-b]5H-quinazoline;

7,8-dibromo-5-phenyl-imidazolidino[5,1-b]5H-quinazoline;

7-chloro-2-methyl-3-(5-nitro-2-furyl)-5-phenyl-imidazolidino[5,1-b]5H-quinazoline; and 7-chloro-2-benzyl-5-phenylimidazolidino[5,1-b]5H-quinazoline.

It is known that the treatment of asthma and emphysema has been previously effected with such drugs as adrencorticosteroids, epinephrine-type agents (e.g. isoproterenol) and theophylline-type (e.g. aminophylline) acting agents. However, although the use of these agents have met with some degree of success, it is also well known that the prior art bronchodilating agents exhibit serious side effects so that to date no one type of drug is particularly satisfactory. I have found that the compounds of this invention exhibit marked and effective bronchodilating effects without the heretofore encountered side effects of the bronchodilating agents previously employed for the alleviation, treatment and control of asthma and emphysema. By standard toxicity tests and by standard pharmacologic assays for the determination of bronchodilating effectiveness. Representative of such assays is the modified technique of Duncan and List (J. Allergy 32: 139–51, 1961) wherein male guinea pigs, 300–400 gms. are subjected to an aerosol of a 0.1% solution of histamine dihydrochloride or mecholyl chloride in a closed spray-chamber. The animals are removed immediately following the onset of dyspnea (irregular or spasmodic breathing).

Four hours after the control aerosol challenge the animals are given the test drug orally and then re-exposed to the aerosol in order to determine any increase in the time of onset of dyspnea which would signify effective protection against the bronchoconstrictor action of histamine or mecholyl.

The $ED_{200}$ sec., or that dose of drug which protects the animals against dyspnea for 200 seconds of exposure to aerosol, is determined by oral administration of the test drug one hour before the re-challenge with aerosol. Ten animals per log dose are used in this assay. The average values obtained from the test groups are used to calculate the estimated $ED_{200}$ sec. The control animals usually show an onset-of-dyspnea-time of about 30–50 seconds. From this and other tests it has been found that the compounds of this invention exhibit useful bronchodilating effects at 1–100 mg./kg. of body weight and are protective and therapeutic against anaphylaxis in guinea pig lungs. Indeed, it has been found that a broad spectrum of in vitro pharmacological activities, as determined with standard Magnus-type isolated guinea pig intestinal or tracheal segments, plus other data of in vitro experiments on guinea pig isolated, perfused lungs and oral studies in intact guinea pigs indicate that the compounds of this invention have unique bronchodilating action useful in the treatment of asthma and emphysema when compared with the prior art bronchodilating agents.

Further, by an extension of the standard assay techniques utilizing various combinations of antihistamines and/or bronchodilators (i.e. theophylline derivatives) it is found that no standard antihistamine was able to synergize with theophylline derivatives (particularly aminophylline and isoproterenol) whereas the compounds of this invention, particularly 7-chloro-2-methyl-5-phenyl-imidazolidino[5,1-b]5H-quinazoline, do produce synergistic and potentiating effects with theophylline derivatives. Particularly useful compounds of this invention (Formulae I and Ia) are those compounds wherein the 2-position substituent is hydrogen or lower alkyl, $R_2$ is methyl or hydrogen, $R_3$ is hydrogen, and X, Y and Z represent hydrogen and/or chloro or methoxy.

In their function as therapeutically useful compounds, it is advantageous to administer the compounds to the host animal in admixture with an acceptable pharmaceutical carrier suitable for enteral or parenteral administration, said carrier constituting a major portion of the admixture. Such preparations may be in such forms as, for example, tablets, capsules and suppositories, or in liquid forms as, for example, elixirs, emulsions, sprays, and injectables. In the formulation of pharmaceutical preparations there can be employed such substances which do not react with the active substance as, for example, water, gelatin, lactose, starches, magnesium stearate, calcium carbonate, talc, vegetable oils, benzyl alcohols, gums, polyalkylene glycols, petroleum jelly and the like. The active ingredient of such pharmaceutical preparations is preferably present in the preparation in such proportions by weight that the proportion by weight in the active ingredient to be administered lies between 0.1% and 50%.

Tablet formulation

The following formulation provides for the manufacture of 1,000 tablets:

|  | Grams |
|---|---|
| (1) 7-chloro-2-methyl-5-phenyl-imidazolidino[5,1-b]5H-quinazoline | 25 |
| (2) Lactose, U.S.P. | 181 |
| (3) Corn starch, U.S.P. | 92.5 |
| (4) Magnesium stearate | 1.5 |

Thoroughly granulate a mixture of 92.5 g. of corn starch and the lactose with a paste prepared by dissolving 20 gm. of corn starch in 100 ml. of hot distilled water. Dry the resulting granulation at 40–45° C. and pass it through a No. 16 mesh screen. To the dried, screened granulation add a blended mixture of the active ingredient (1) and the magnesium stearate. Thoroughly blend and then press into tablets of 300 mg. each.

Capsule formulation

The following formulation provides for the manufacture of 1,000 capsules:

|  | Grams |
|---|---|
| (1) 7-chloro-2-methyl-5-phenyl-imidazolidino[5,1-b]5H-quinazoline | 25 |
| (2) Lactose, U.S.P. | 273.5 |
| (3) Magnesium stearate | 1.5 |

Mix active ingredient (1) with the lactose and blend in the magnesium stearate. Fill hard gelatin capsules with 300 mg. each of the blended mixture to produce capsules containing 25 mg. of 7-chloro-2-methyl-5-phenyl-imidazolidino[5,1-b]5H-quinazoline.

Parenteral formulation

The following formulation provides for the manufacture of 1,000 vials each containing 10 mg. of active ingredient:

| (1) 7-chloro-2-methyl-5-phenyl-imidazolidino[5,1-b]5H-quinazoline | gm | 10.0 |
|---|---|---|
| (2) Monobasic potassium phosphate | gm | 6.0 |
| (3) Water for injection, U.S.P., q.s. | liter | 1.0 |

Dissolve ingredients (1), (2), and (3) in approximately 80 percent of the volume of water and filter the resulting solution. Add to the filtrate sufficient water to make to a 1000 ml. volume. Sterile-filter the solution and asceptically fill one milliliter portions of the so-prepared solution into two milliliter vials, then lyophylize. After the lyophilized cake is dry, asceptically stopper the vials with rubber plugs and seal.

Oral suspension (1) 7-chloro - 2 - methyl-5-phenyl-imidazolidino-
    [5,1-b]5H-quinazoline _____ mg./5 ml__  100.0
(2) Veegum, Vanderbilt _____ do____   50.0
(3) Standard granulated sugar, U.S.P. ___do____ 2500.0
(4) Sorbitol solution, U.S.P. _____ do____ 1250.0
(5) Sodium saccharin, N.F. _____ do____   50.0
(6) Sodium benzoate, U.S.P. _____ do____    5.0
(7) Ethanol, U.S.P. _____ ml__    0.025
(8) Menthol, U.S.P. _____ mg./5 ml___    1.000
(9) Flavor _____ Q.s.
(10) Purified water, U.S.P., to make 5 ml.

Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the 7-chloro-2-methyl-5-phenyl-imidazolidino[5,1-b]5H-quinazoline with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

It is, of course, obvious to one of ordinary skill in the art to reduce the 1,2-double bond of the 3,4-dihydroquinazoline nucleus of those compounds embraced by Formula I so as to produce the corresponding $2R_1$-$3R_2R_3$-5-phenyl-imidazolidino[5,1-a]5,10H - quinazoline (and the [5,1-b]isomers thereof). As expected, these compounds have equivalently functioning applied-use characteristics. Conveniently, the compounds of this invention embraced by Formula I are readily reduced by reaction with lithium aluminum hydride (and other equivalent procedures) according to techniques well known in the art.

I claim:

1. A compound of the formulae:

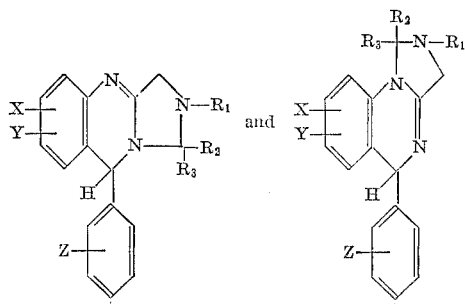

and the pharmaceutically acceptable acid addition salts thereof, wherein $R_1$ is hydrogen, saturated and unsaturated hydrocarbyl radicals having up to six carbon atoms, cyclo lower alkyl, phenyl, pyridyl lower alkyl, phenyl lower alkyl, hydroxy lower alkyl, or

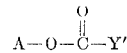

wherein A is lower alkyl, and Y' is a member of the group consisting of alkyl, alkenyl and alkynyl radicals having up to 18 carbon atoms; $R_2$ is hydrogen or lower alkyl; $R_3$ is hydrogen, lower alkyl, phenyl, phenyl lower alkyl, pyridyl, pyrryl, imidazyl, furyl, thienyl, oxazolyl, thiazolyl, isoxazolyl, pyrazinyl, piperidyl, indolyl, quinolyl, isoquinolyl, halolower alkyl, and $R_2$ and $R_3$, when taken together with the carbon atom to which they are attached, form a cyclo lower alkyl moiety; and each of X, Y and Z radicals are hydrogen, halogen, trifluoromethyl, lower alkyl, nitro or lower alkoxy.

2. A 5-phenyl-imidazolidino[5,1-b]5H-quinazoline of claim 1 wherein $R_1$ is lower alkyl, $R_2$ and $R_3$ are each hydrogen, X is halogeno, Y and Z are each hydrogen.

3. A 5-phenyl-imidazolidino[5,1-a]5H-quinazoline of claim 1 wherein $R_1$ is lower alkyl, and $R_2$ and $R_3$ are each hydrogen.

4. A 5-phenyl-imidazolidino[5,1-b]5H-quinazoline of claim 1 wherein $R_1$ is methyl, $R_2$, $R_3$, Y and Z are each hydrogen and X is 7-chloro.

5. A 5-phenyl-imidazolidino[5,1-a]5H-quinazoline of claim 1 wherein $R_1$ is methyl, $R_2$, $R_3$, Y and Z are each hydrogen and X is 7-chloro.

6. A compound of claim 1 wherein $R_1$ is lower alkyl, $R_2$ and $R_3$ are hydrogen, X, Y and Z are each hydrogen.

7. A compound of claim 1 wherein $R_1$ is methyl and each of $R_2$, $R_3$, X, Y and Z are hydrogen.

8. A compound of claim 1 wherein $R_1$ is lower alkyl, $R_2$ and $R_3$ are each hydrogen, X and Y are each lower alkoxy and Z is hydrogen.

References Cited

UNITED STATES PATENTS 3,329,679   7/1967   Sulkowski et al. ____ 260—256.4

ALEX MAZEL, Primary Examiner

R. J. GALLAGHER, Assistant Examiner

U.S. Cl. X.R.

260—251, 256.5, 575; 424—232, 251, 253